United States Patent [19]

Laird

[11] Patent Number: 4,895,448

[45] Date of Patent: Jan. 23, 1990

[54] METHOD AND APPARATUS FOR DETERMINING THE SURFACE QUALITY OF AN OBJECT

[76] Inventor: Richard P. Laird, 3705 W. Carmel, Peoria, Ill. 61615

[21] Appl. No.: 143,512

[22] Filed: Jan. 13, 1988

[51] Int. Cl.⁴ .............................................. G01B 11/24
[52] U.S. Cl. ...................................... 356/376; 356/237
[58] Field of Search ................... 356/371, 372, 376, 1, 356/237, 394

[56] References Cited

U.S. PATENT DOCUMENTS

| 3,627,427 | 12/1971 | Johnson et al. | 356/376 |
| 4,742,237 | 5/1988 | Ozawa | 356/376 |

FOREIGN PATENT DOCUMENTS

| 122906 | 9/1981 | Japan | 356/371 |
| 206908 | 12/1983 | Japan | 356/371 |
| 23205 | 2/1984 | Japan | 356/371 |
| 200141 | 10/1985 | Japan | 356/376 |
| 175511 | 8/1986 | Japan | 356/376 |

OTHER PUBLICATIONS

Hammond et al, *IBM Technical Disclosure Bulletin*, vol. 14, No. 1, Jun. 1971, pp. 49 and 50.
Herman et al., *Technical Digest*, No. 44, Oct. 1976, pp. 27 and 28.

*Primary Examiner*—F. L. Evans
*Attorney, Agent, or Firm*—Fay, Sharpe, Beall, Fagan, Minnich & McKee

[57] ABSTRACT

A method for determining the surface quality of an object includes the steps of providing an object having a surface and projecting a series of spaced parallel lines onto the surface of the object from a first axis. The pattern formed by the lines on the object surface is viewed and any non-uniformity of the object's surface is ascertained by observing a variation of the line spacing on the object's surface.

25 Claims, 3 Drawing Sheets

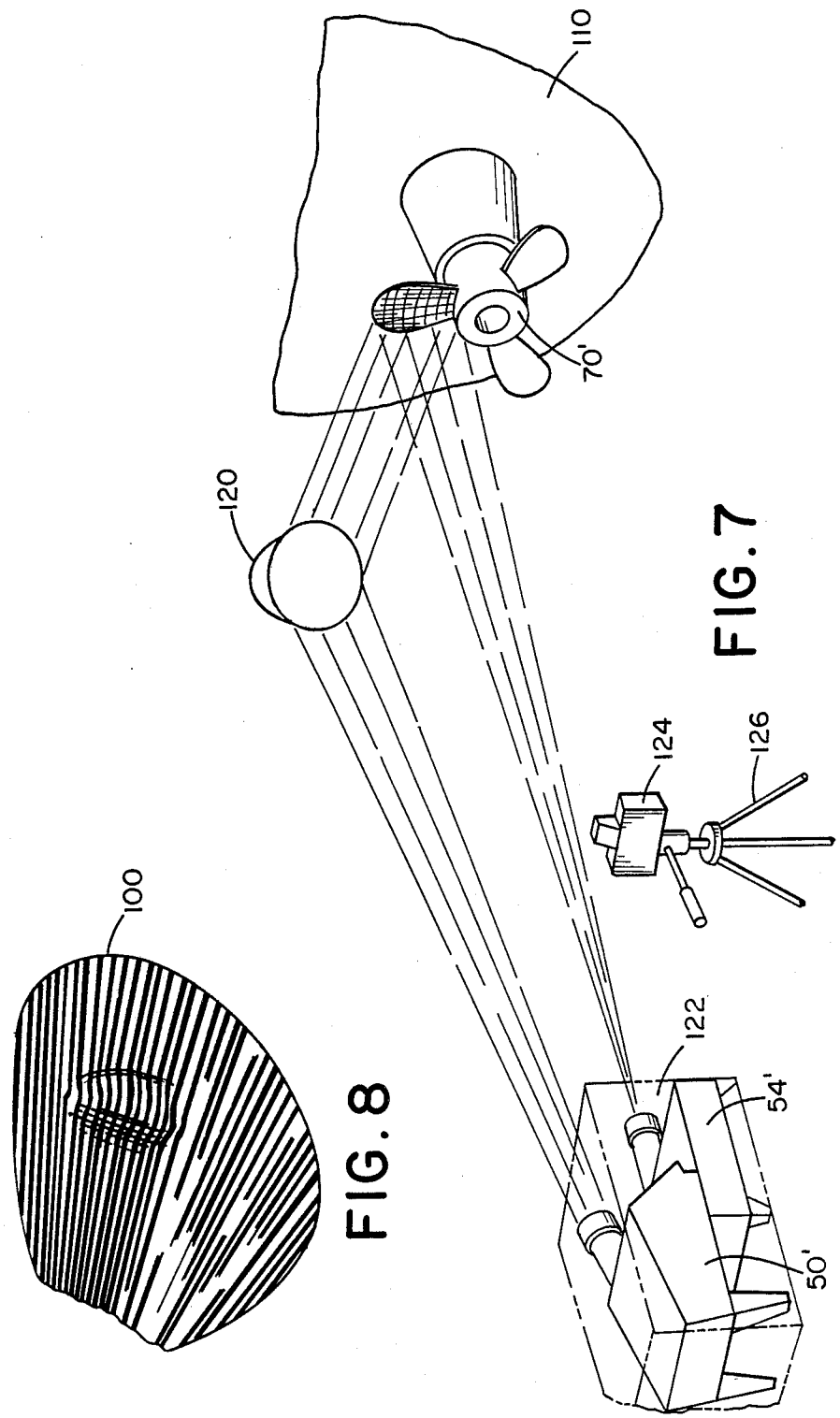

METHOD AND APPARATUS FOR DETERMINING THE SURFACE QUALITY OF AN OBJECT

BACKGROUND OF THE INVENTION

This invention generally pertains to the art of industrial inspection. More specifically, the present invention relates to a method for determining the surface quality of an object in a non-contacting fashion and an apparatus for practicing the method.

The invention is particularly applicable to a method for very precisely measuring the pitch and surface finish of a helicoidal surface, such as a blade on a marine propeller. However, it will be appreciated that the method and apparatus disclosed herein can also be used to measure the relative accuracy of any curved or flat surface wherein flatness, concentricity, parallelism, or uniformity are important. Thus, the method and apparatus disclosed herein can be used for the measurement of pitch and surface quality on aircraft propellers, axial flow pump impellers, process agitators for chemical production plants or refineries, sewage irrigation pump impellers, gas and steam turbine blades, torque converter blades, and runners, rotors, and stators in hydroelectric power turbines. Additionally, the invention disclosed herein can also be used in measuring the surface quality of cutting surfaces such as dies used in press forming operations as well as the surface quality of complex curved shapes such as body panels on vehicles or airplane wings and control surfaces. The invention can also be used to measure the relative smoothness of flat surfaces such as warehouse floors and the like.

The conventional propeller consists of two or more equally spaced radial blades which are rotated at a substantially uniform angular velocity. A marine propeller may be regarded as part of a helicoidal surface which, as it rotates, appears to "screw" its way through the water, driving water aft and the vehicle forward. The surface of the propeller blade facing aft experiences an increase in pressure thereby producing thrust. This surface is called the "face" of the blade. The forward-facing surface of the propeller is called the "back." The propeller face is commonly constructed as a true helical surface of constant pitch. The back is generally not a helical surface except in situations such as in submarine propellers where quietness of operation is a prerequisite. The shapes of blade outlines and sections of a propeller vary greatly according to the type of ship for which the propeller is intended.

The objective of propeller design is to produce a propeller that will convert the ship's power into thrust at the best possible efficiency. The propeller has to be strong enough to withstand all of the forces involved without causing blade fracture and needs to be shaped in such a way that the harmful effects of cavitation are avoided.

The passage of water past a propeller sets up a pressure reduction on the back of the blades and a pressure increase on the face of the blades. The largest contribution to the propeller thrust comes from the pressure reduction. If the pressure at any point falls to the pressure at which water vaporizes, then cavities of vapor are created in the water. This phenomenon is termed "cavitation". Such cavitation can be harmful to the efficient operation of the propeller because the subsequent collapse of the cavities can cause erosion of blade surfaces and increased vibration. Additionally, cavitation causes noise which is extremely detrimental in propellers intended for submarine applications.

Presently, the measurement of pitch and surface quality on marine propeller blades is done by a very complex machine and numerous man-hours are required to complete the measurement. It is understood by the inventor that the state of the art for measuring submarine propeller blades now requires the use of a contour scanning machine which costs on the order of $15 million and has a plurality of stylus arms or probes to measure the pitch and surface quality at a plurality of discrete locations on a propeller blade. It is also understood by the inventor that the state of the art process in submarine propeller inspection is a very time consuming and manpower intensive process. Additionally, even the most sophisticated machines are incapable of detecting minute imperfections in the surface quality of a propeller blade and only the fingertips of a highly trained human being are capable of detecting such flaws.

Generally, flaws, such as scratches, dents, pits, and cracks, can occur during the production of a propeller blade or they can result from damage to the blade surface subsequent to production. Any such flaws need to be detected and repaired before the propeller is put into operation initially or is returned to operation, as the case may be.

Accordingly, it has been considered desirable to develop a new and improved method and apparatus for determining the surface quality and, if desired, the pitch of an object which would overcome the foregoing difficulties and others while providing better and more advantageous overall results.

BRIEF SUMMARY OF THE INVENTION

In accordance with the present invention, a new and improved method for determining the surface quality of an object is provided.

More particularly in accordance with the invention, the method comprises the steps of providing an object having a surface and projecting a series of spaced parallel lines from a first axis onto the surface of the object. The pattern formed by the lines on the object's surface is viewed and any non-uniformity of the object's surface is ascertained by observing a variation of the line spacing on the object's surface.

According to another aspect of the invention, the method further comprises the step of projecting a series of diverging radial lines onto the object's surface. The radial lines can be projected onto the object's surface from a second axis approximately perpendicular to the first axis. Preferably, a series of spaced concentric circular or semicircular lines are also projected onto the object's surface from the second axis. These lines are projected simultaneously with the radial lines.

According to still another aspect of the invention, the method further comprises the step of recording the pattern made by the spaced parallel lines on the object's surface.

According to yet another aspect of the invention, the object is a propeller blade and the method further comprises the steps of projecting a series of spaced parallel substantially horizontal lines onto a second surface of the blade from the first axis and viewing a pattern formed by the lines on the object's second surface. Any non-uniformity on the object's second surface is ascertained by observing a variation of line spacing on the object's second surface.

According to still yet another aspect of the invention, the object surface is a helicoidal surface and the method further comprises the step of measuring a pitch of the helicoidal surface.

According to a further aspect of the invention, the method further comprises the step of providing a first projector means having a lens through which the spaced parallel lines are projected. Preferably, the spaced parallel lines are projected along a substantially horizontal axis such that the lines are substantially horizontally oriented.

According to a still further aspect of the invention, the method comprises the step of providing a second projector means having a lens through which the diverging radial lines are projected. Preferably, the diverging radial lines are projected along a substantially vertical axis such that at least one of the lines is substantially vertically oriented. In addition, the object is preferably a propeller having a hub and at least one blade and the method further comprises the step of projecting a crosshair and a pattern of concentric semicircular or circular lines onto the propeller hub so as to correctly align the diverging radial lines on the propeller at least one blade.

In accordance with another aspect of the invention, an apparatus for measuring the pitch and surface quality of a propeller blade is provided.

More particularly in accordance with this aspect of the invention, the apparatus comprises a propeller having a hub and at least one blade and a means for supporting the propeller. A first means is provided for projecting a series of spaced parallel lines onto a blade surface of the propeller.

In accordance with a still further aspect of the invention, a method for measuring the pitch of a helicoidal surface is provided.

More particularly, in accordance with this aspect of the invention, an object which has a helicoidal surface is provided. A series of closely spaced parallel lines are projected on the helicoidal surface from a first axis to form a pattern on the helicoidal surface. Any variation of the line spacing in the pattern formed by the lines on the object helicoidal surface is observed.

One advantage of the present invention is the provision of a new and improved method for determining the surface quality of an object.

Another advantage of the present invention is the provision of a method for measuring the pitch of a helicoidal surface.

Still another advantage of the present invention is the provision of an inexpensive and easy to use apparatus for measuring the pitch and surface quality of a helicoidal surface such as a propeller blade.

A still further advantage of the present invention is the provision of a non-contact type method for determining surface quality which enables a speedy and inexpensive measurement of surface quality to be made.

A yet further advantage of the invention is the provision of an apparatus for determining surface quality which includes the use of a means for projecting a series of spaced parallel lines onto the surface whose quality is meant to be measured.

An additional advantage of the present invention is its ability to quickly, accurately and completely record and store the results of an inspection of surface quality and/or pitch.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 7 is a perspective view of a second preferred embodiment of the apparatus according to the present invention in use with a propeller blade mounted on a ship; and, FIG. 8 is an enlarged view of a portion of a propeller blade illustrating the spacing of the lines of the first reticle of FIG. 2 on a surface discontinuity of the propeller blade surface.

DETAILED DESCRIPTION OF THE PREFERRED EMBODIMENTS

Figure 1:
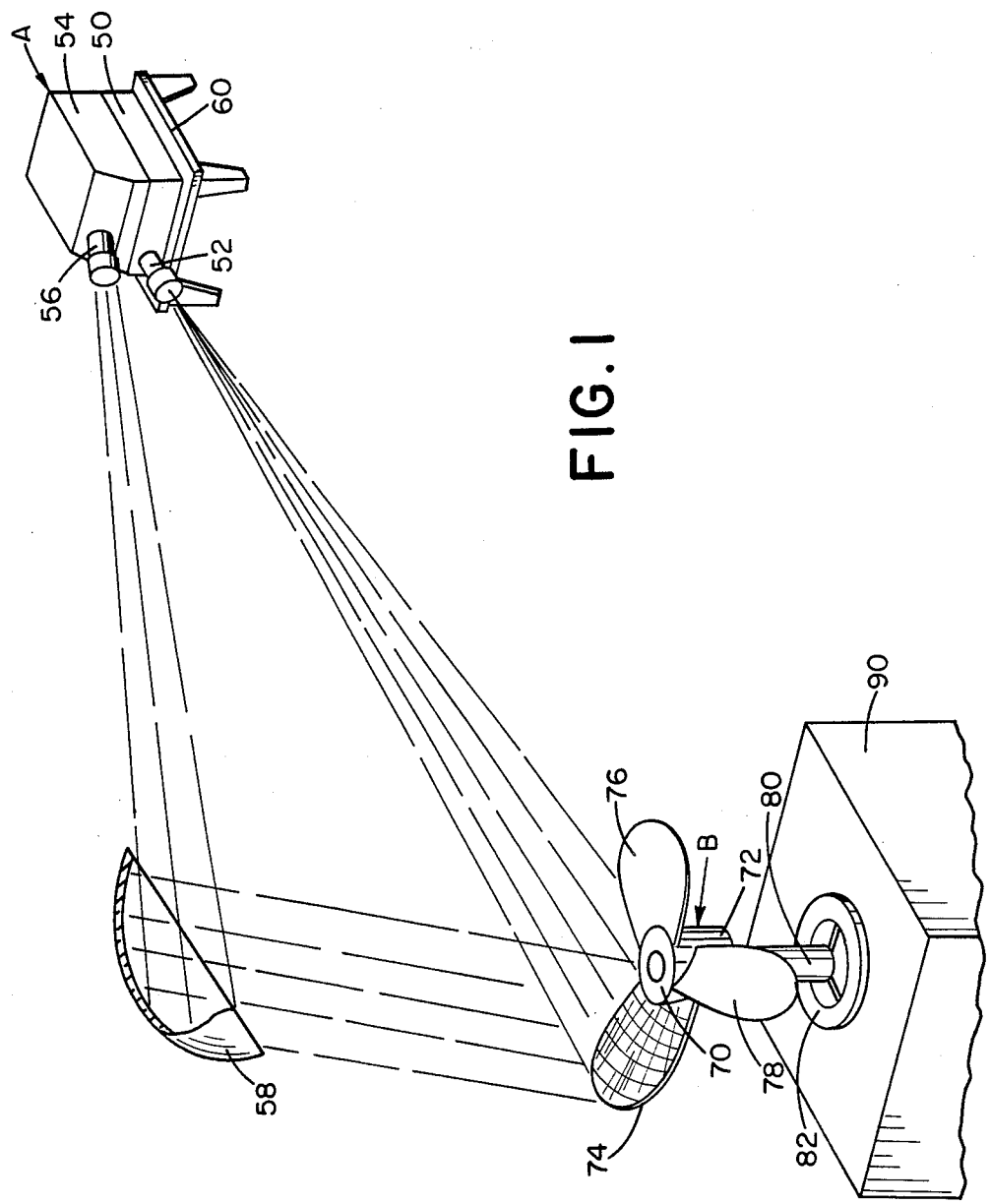
FIG. 1 is a perspective view of an apparatus for determining the surface quality of an object such as a propeller blade according to a first preferred embodiment of the present invention.

Referring now to the drawings wherein the showings are for purposes of illustrating preferred embodiments of the invention only and not for purposes of limiting same, FIG. 1 shows the subject new means A for projecting an image onto an object B. While the object B is illustrated to be a ship's propeller, it should be recognized that the object could also be any other type of helicoidal surface such as an aircraft propeller, an axial flow pump impeller, a process agitator for chemical production plants or refineries, a sewage aeration pump impeller, and the like. More broadly, the object could be any curved or flat surface wherein flatness concentricity, parallelism or uniformity are important. Such surfaces can include gas and steam turbine blades, torque converter blades, runners, rotors and stators in hydroelectric power turbines, dies in press forming operations, body panels for automobiles, airplane wings and control surfaces, warehouse floors and the like.

Figure 2:
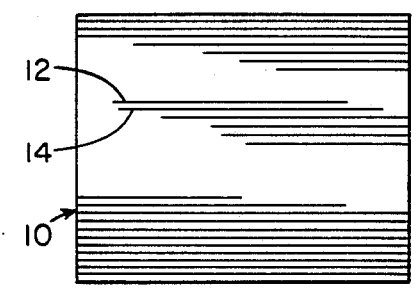
FIG. 2 is an enlarged front elevational view of a first reticle having a plurality of spaced parallel lines, which is used in the apparatus of FIG. 1.
Figure 3:
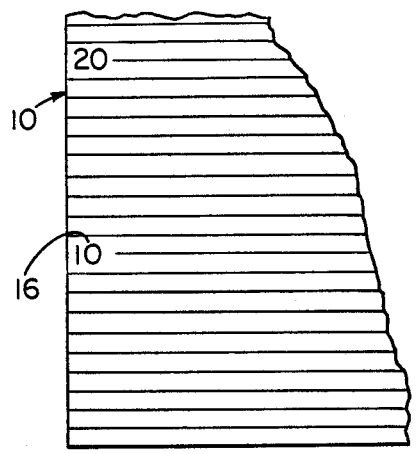
FIG. 3 is a greatly enlarged view of a portion of the reticle of FIG. 2.

With reference now more particularly to FIG. 2, the means A comprises a first reticle 10 that includes a grid having a plurality of spaced substantially parallel lines 12, 14. In this embodiment, the lines are horizontally oriented and a great number of lines are provided, such as 300 lines per inch of reticle surface. If desired, one line in each increment or set of lines can be identified in some particular way. For example, as illustrated in FIG. 3, each tenth line can be numbered as at 16. Of course, other ways of identifying each tenth line could be used instead such as the provision of a dotted line or a line of a different color or the like.

The reticle 10 is a grid or pattern of a transmission grating such as a Ronchi grating. In other words the grid includes a series of narrow, parallel, closely spaced lines which act as sources of cylindrical light wavefronts when illuminated by a substantially planar wavefront of light. While the grid of a prototype has 300 lines per inch in the reticle of FIG. 2, higher quality gratings can also be provided which could have higher numbers of lines per inch. Higher numbers of lines per inch are advantageous in most applications.

Figure 4:
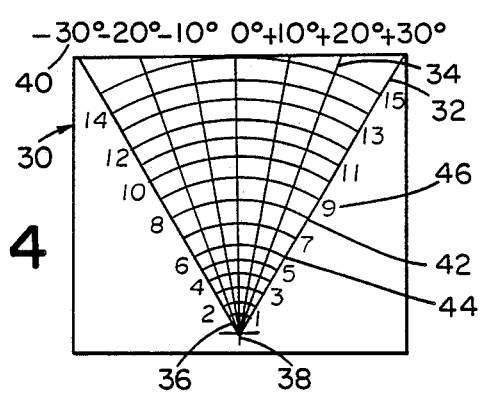
FIG. 4 is a front elevational view of a second reticle having a plurality of diverging radial lines and concentric semicircular lines, which is used in the apparatus of FIG. 1.

With reference now to FIG. 4, a second reticle 30 can be provided for the means A. The second reticle 30 includes a plurality of radially diverging lines 32, 34 which emanate from an apex 36. Preferably located at the apex is a crosshair 38. If desired, suitable indicia 40 can be provided on the radially diverging lines to indicate angles. While the indicia is not shown to be on the reticle in FIG. 4, such positioning of the indicia could be provided if desired.

Also positioned on the reticle 30 are a plurality of concentric semicircular lines 42, 44. One or more of these may have indicia 46 associated therewith if desired. Preferably, the concentric lines are equally spaced except near the apex 36 where they may be more closely spaced in relation to each other. Instead of semicircular lines, circular lines could be used, especially adjacent the apex 36, if desired.

It is believed that the patterns on the reticles 10, 30 of FIGS. 2 and 4 would be more clearly seen on the surface of the object B if the reticles were provided with opaque backgrounds having transparent lines thereon. It is believed that this would provide an appropriate amount of light through the reticle in question.

With reference again to FIG. 1, a first projector 50, which can be a conventional slide projector, is provided with a source of light (not illustrated) and a lens 52 for projecting light through the first reticle 10 which is held in the projector and can be housed in a conventional slide mount (not illustrated) if desired. A second projector 54 having a source of light and a second lens 56 is provided for projecting light through the second reticle 30 which can similarly be housed in a slide mount. The light from the second projector is preferably reflected by a mirror 58 onto the object B. The mirror 58 is preferably a parabolic mirror. Such a mirror is advantageous in reflecting a wide parallel light beam incident to the principal axis of the mirror in such a way as to give a reflected light beam converging on a principal focus point which will be at the object B. However, under some circumstances a plane mirror may also be adequate. If desired, the light from the first projector can also be reflected by the mirror before striking the object B.

If desired, a means for supporting the pair of projectors 60, such as a table, can be provided.

Alternatively, the second projector 54 can be mounted above the object B in order to shine directly down on it, if desired.

The object B is preferably a propeller 70 having a hub 72 and a plurality of blades such as the three blades 74, 76 and 78 illustrated. Preferably, the first projector's beam is directed onto one of the blades such as the propeller blade 74 along one axis. The propeller is mounted on a shaft 80 which is secured in a collet 82 of a means for indexing the propeller such as a vertical mill table 90. The propeller is suitably mounted so that either the "face" or "back" surface of each blade can be examined. Upon indexing, which is done by a control means rotating the collet, each of the blades 74, 76, 78 can be measured. The means for mounting 90 as well as the means for supporting 60 and the mirror 58 all need to be rigidly secured so as to be unaffected by vibrations which would disturb the light projections on the propeller surface. The projectors 50, 54 can be positioned at a convenient distance determined by focal length from the propeller 70.

Figures 5, 6:
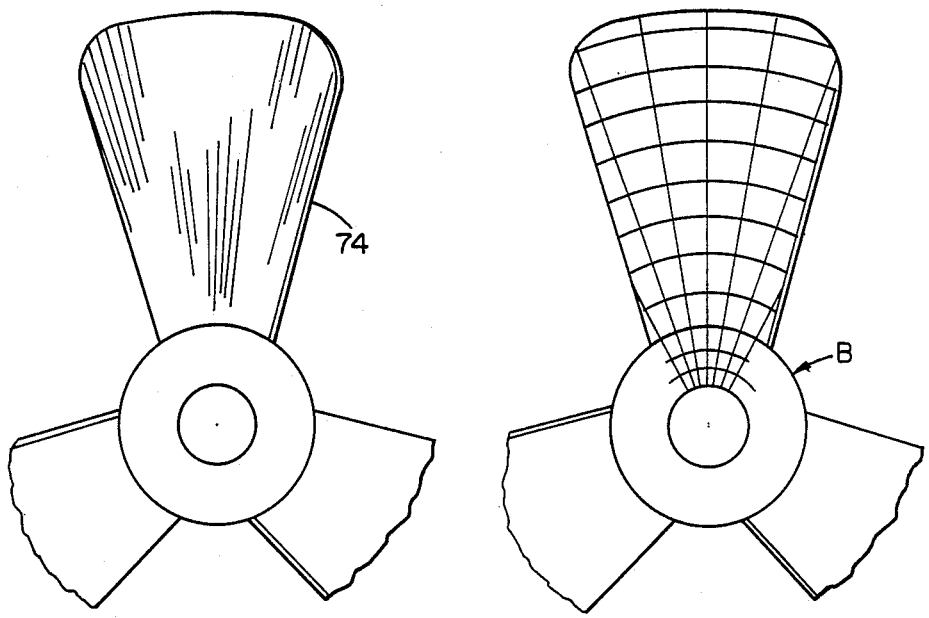
FIG. 5 is an enlarged partially broken away view of a portion of a propeller which has the parallel lines of the first reticle of FIG. 2 projected on a blade thereof.
FIG. 6 is an enlarged partially broken away view of a propeller having the radial and concentric semicircular lines of the second reticle of FIG. 4 projected thereon.

The first beam's pattern is created by the first reticle 10 and consists of a great many horizontal lines such as the 300 lines per inch mentioned above. Those lines, when projected onto the surface of the propeller blade 74 as shown in FIG. 5, appear as horizontal contour lines, like those used to describe elevation differences on a topographical map. Just as the horizontal contour lines on a topographical map allow an observer to determine the relative steepness of various portions of mountainous slopes shown on the map, so the first reticle's pattern of horizontal lines allows an observer to check for errors or discontinuities in the profile of any propeller examined.

The second reticle 30 is important only from the standpoint of providing a polar coordinate framework for the measurement process. When the object B is a propeller blade as shown in FIG. 6, measurements thereof are conventionally taken in a polar coordinate framework. For example, measurements are taken at 0.5, 0.7, and 0.9 times the blade radius at three different angular points such as —10°, 0° (directly along the blade's radial line), and +10°. Therefore polar coordinates give an organized way of keeping track of where measurements have been made. It should be recognized that other grid frameworks can be useful for inspecting other types of surfaces.

Greater accuracy results from using reticles which have the largest practical number of lines per inch. The larger the number of lines, the smaller the propeller profile error which can be detected. To reduce the small error incurred by divergence of the beam over the width of the propeller blade, it is appropriate to minimize the included angle of a projector beam. This can be done in any of three ways. First, a relatively long focal length lens, i.e. a 200 mm lens, can be used on the projector because this will reduce the beam's divergence over the propeller blade width to negligible levels.

Second, a slide projector having a lens of smaller than normal aperture could be provided through which the projector beam is transmitted as this will result in a much greater depth of field of the projected image. In some experiments, it has been discovered that a $\frac{3}{8}''$ aperture in the projector lens through which light is emitted will greatly increase the depth of field of sharply focused lines in the horizontal spaced line pattern illustrated in FIG. 5 in order to cover the entire width of the propeller blade 74 instead of just a narrow band in the center of the propeller blade.

Alternatively, a suitable parabolic mirror could be used to reflect the beam from the first projector 50 before it falls on the propeller blade as this would reduce the divergence of the light on the propeller blade surface to zero by eliminating divergence error totally.

A zoom lens may be provided on the projector as this may be advantageous under some conditions. More specifically, a zoom lens on the projector will reduce the necessity of moving the projector back and forth in order to accommodate propellers of varying blade widths.

The second projector's beam can be directed onto to the propeller blade from a location directly above the blade. The second beam's pattern of radial lines and concentric circles looks somewhat like a pie-shaped slice from a spider's web. In setting up the system, the crosshair 38 should fall on top of the propeller hub's center. In this way, the radial lines converge at the center of the propeller hub. The concentric circles or semicircles are used to correctly align the crosshair on the center of the propeller hub.

Pitch can be thought of as the vertical distance a propeller's surface advances in one revolution. When a propeller is being measured by the method and apparatus according to the present invention, the number of horizontal lines of the first beam, within any two angles of the second beam, is the elevation difference per increment of rotation. That is, pitch. If the vertical distance between the lines of the first projector's pattern is chosen to match the angular spacing of the radial lines of the second projector's pattern, then no calculations will be necessary to determine propeller pitch. In other words, the number of the horizontal lines included within the radial and semicircular lines of the second pattern can be counted to directly yield pitch, in whatever system of units the operator chooses. To take a practical example, if the diverging radial lines 32, 34 of the second reticle 30 are so chosen that they vary by 10°, i.e. 36 in 360° and the semicircular lines 42, 44 have any given standard spacing, and if the parallel lines 12, 14 of the first reticle are so projected that there are 36 lines per vertical inch, at the propeller hub axis, then one can directly determine the propeller's pitch in inches just by counting the parallel lines within any 10° angular increment on the pattern as projected on the blade's surface.

The lines of light from the first light beam are regular, straight, and appear to converge at the center of the propeller hub where the propeller profile is accurate and true. However, the pattern of light warps and bends in an irregular pattern wherever the light falls on the slightest irregularity in the blade surface as is evident from the blade 100 illustrated in FIG. 8. The measuring system of the present invention will detect and quantify smaller inaccuracies in propeller blades than any known system of propeller measurement. Additionally, it is considerably less expensive than any known system of current commercial significance. Moreover, the instant measuring system is many times faster than conventional measuring systems. For example, it should take one man approximately 10 minutes to measure, and record his reading of the profile of a propeller blade in accordance with the method and apparatus of the instant invention.

Propeller accuracy is vital to vessel performance, fuel economy, and engine life. Yet propeller accuracy has been poorly understood and rarely achieved by the marine industry as a whole. The instant invention offers a way to examine an entire propeller blade at once in order to assure that the propeller profile is accurate and true. Because vessel performance is so dependent upon the accuracy of the propeller used, boats equipped with propellers that are examined according to the instant invention will be faster, quieter, more fuel efficient, experience less vibration, and have longer lives than conventionally examined propellers.

For propellers which must be particularly exact in shape on both the face and back surfaces, such as submarine propellers and racing boat propellers, the method and apparatus of the present invention can be employed also on the back surface of the propeller to insure that it also is of the desired pitch and surface quality.

With reference now to FIG. 7, it can be seen that a propeller could remain mounted on a ship and still be measured in accordance with the instant invention. For ease of illustration and appreciation of this alternative, like components are identified by like numerals with a primed suffix (') and new components are identified by new numerals.

In this FIGURE, a propeller blade 70' is mounted on a ship 110 while it is being examined. The ship 110 can be in dry dock or so ballasted that its stern lifts out of the water far enough to uncover its propeller 70'. First and second projectors 50', 54' are provided in order to shine light beams on the propeller 70' as in FIG. 1. This would be particularly useful when repairing propeller blades in situ. In this embodiment, however, the light from the first projector 50' is reflected before striking the propeller 70' and the light from the second projector 54' shines directly on the propeller. Also, the first grid lines of the first reticle are vertically oriented as may be evident from the FIGURE.

Use of a parabolic mirror 120 suspended at an oblique angle adjacent the propeller will allow the first projector 54' to be mounted next to the second projector 50' within a common glass fronted enclosure 122. This is advantageous because the places where the system will receive the bulk of its use are dirty, dusty, and smoky and projectors inadequately protected would require extra maintenance.

A propeller profile image can also be recorded in any suitable manner either photographical or electronic and either by analog means or digitally. One suitable way of recording the image is by the use of a camera 124 mounted on a tripod 126, in order to quantify a particularly desirable profile for future purposes such as repair or the manufacture of another, identical, blade. When damage would occur, the propeller could be re-examined by this technique after repair in order to confirm that it has been restored absolutely precisely to its original accuracy. This is extremely important not only in the submarine field where it is critical that the propeller be completely smooth in order that an absolute minimum of noise be created as the submarine moves through the water, but also for many other applications. One such application is power boat racing. Conventionally, a power boat racer will attempt to optimize the performance of his racing boat by an expensive trial and error approach utilizing 10 to 15 propellers which are mounted, tested, and demounted from the boat's propeller shaft before he finally settles on one propeller which meets his needs. Using the instant invention, a boat racer can identify the precise characteristics of a propeller that he likes in order that it can be duplicated precisely by a manufacturer.

While almost any camera 124 will suffice in the hands of a competent photographer for recording the image of the lines projected onto a propeller blade, a camera with a relatively long telephoto lens and an automatic exposure control system capable of extended exposure times (i.e. on the order of 3 to 30 minutes for an F16 lens and 80 ASA film) will optimize the accuracy of the photograph.

Although a greater depth of focus of the projected pattern of precise horizontal lines will result from the use of a smaller diameter orifice, as mentioned above, it should be noted that pattern brightness, will decrease rapidly as orifice diameter decreases. This may force work area light levels to be too dim and camera times for photographic purposes to be inconveniently long. Therefore these two factors need to be balanced.

A conventional polarizing filter over the projector lens, and an accompanying perpendicularly oriented conventional polarizing filter on the camera lens (neither is illustrated) will help in minimizing a flare affect during photography.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

What is claimed is:

1. A method for determining the surface quality of an object comprising the steps of:
    providing an object having a surface;
    projecting a series of spaced parallel lines on the surface of the object from a first axis;
    projecting a series of diverging radial lines onto said object surface;
    viewing a pattern formed by said lines on said object surface; and,
    ascertaining any non-uniformity on said object surface by observing a variation of said line spacing on said object surface.

2. The method of claim 1 wherein said series of diverging radial lines are projected from a second axis approximately perpendicular to said first axis, and further comprising the step of projecting a series of spaced concentric at least semicircular lines onto said object surface from said second axis, said at least semicircular lines being projected simultaneously with said radial lines.

3. The method of claim 1 further comprising the step of recording the pattern made by said spaced parallel lines on said object surface.

4. The method of claim 1 wherein said object is a propeller blade and further comprising the steps of:
    projecting a series of spaced parallel substantially horizontal lines on a second surface of said blade from said first axis;
    viewing a pattern formed by said lines on said object second surface; and,
    ascertaining any non-uniformity on said object second surface by observing a variation of said line spacing on said object second surface.

5. The method of claim 1 wherein said object surface is a helicoidal surface and further comprising the step of measuring a pitch of said helicoidal surface, wherein said step of measuring includes the subsidiary step of counting the number of parallel lines projected from said first axis between any two radial lines.

6. The method of claim 1 further comprising the step of:
    providing a first projector means having a lens through which said spaced parallel lines are projected.

7. The method of claim 1 wherein said spaced parallel lines are projected along a substantially horizontal axis such that said lines are substantially horizontally oriented.

8. The method of claim 6 further comprising the step of providing a second projector means having a lens through which said diverging radial lines are projected.

9. The method of claim 8 wherein said diverging radial lines are projected along a substantially vertical axis such that at least one of said lines is substantially vertically oriented.

10. The method of claim 1 wherein said object is a propeller having a hub and at least one blade and further comprising the step of projecting a crosshair and a series of concentric at least semicircular lines on said propeller hub so as to correctly align said diverging radial lines on said propeller at least one blade.

11. A method for determining the acceptability of the surface quality of an object comprising the steps of:
    providing an object having a surface;
    projecting a first series of spaced parallel lines onto the object surface from a first axis;
    projecting a second series of lines onto said object surface from a second axis; and,
    observing any variation of said line spacing in a pattern formed by said first and second series of lines on said object surface.

12. The method of claim 11 comprising the steps of:
    projecting wherein said second series of lines comprises diverging radial lines which are projected onto said object surface from a second, substantially vertical axis and said first series of lines are projected from a substantially horizontal axis; and, further comprising the step of:
    recording a pattern made by said spaced parallel lines and said diverging radial lines on said object.

13. The method of claim 12 further comprising the step of projecting a series of spaced concentric at least semicircular lines onto said object surface from said second axis, said at least semicircular lines being projected simultaneously with said radial lines.

14. A method for measuring the pitch of a helicoidal surface comprising:
    providing an object having a helicoidal surface;
    projecting a series of closely spaced parallel lines on said helicoidal surface from a first axis to form a first pattern on said helicoidal surface;
    projecting a polar coordinate grid onto said helicoidal surface from a second axis different from said first axis to form a second pattern on said helicoidal surface; and,
    counting the number of parallel lines on said object helicoidal surface between any two polar coordinate lines.

15. The method of claim 14 wherein said object is a propeller having at least two blades and wherein said helicoidal surface is one of said at least two blades of said propeller, and further comprising the step of rotating said propeller in order to allow a second of said at least two blades to be correctly located so as to allow said steps of projecting and counting to occur.

16. The method of claim 15 further comprising the step of recording a pattern made by said spaced parallel lines.

17. The method of claim 14 wherein said object is a propeller and further comprising the step of:
    aligning said polar coordinate grid on said object helicoidal surface such that an apex of said grid is located on a hub of said propeller.

18. An apparatus for measuring the surface quality of a curved surface such as a propeller blade, comprising:
- a propeller having a hub and at least one blade;
- a means for supporting aid propeller;
- a first means for projecting a first series of spaced lines onto a blade surface of said propeller; and,
- a second means for projecting a second series of lines onto said blade surface.

19. The apparatus of claim 18 further comprising an indexing means for indexing said propeller on said means for supporting as desired around a rotation axis of said propeller.

20. The apparatus of claim 18 wherein said first means comprises:
- a first reticle having a series of spaced parallel lines thereon; and,
- a first illuminating means for projecting light through said reticle and onto said at least one blade of said propeller.

21. The apparatus of claim 18 wherein said second means comprises:
- a second reticle having a series of diverging radial lines thereon; and,
- a second illuminating means for projecting light through said second reticle and onto said propeller hub and at least one blade.

22. The apparatus of claim 21 wherein said second means further comprises a means for reflecting light passing through said second reticle onto said propeller hub and at least one blade.

23. The apparatus of claim 21 wherein said reticle also has a series of concentric at least semicircular lines which center around an apex of said series of diverging radial lines.

24. The apparatus of claim 20 wherein said first means further comprises a means for reflecting light passing through said first reticle onto said propeller at least one blade.

25. An apparatus for measuring the surface quality of an object, comprising:
- an object having a surface;
- a first means for projecting a first series of spaced lines onto said object surface from a first axis; and,
- a second means for projecting a second series of lines onto said object surface from a second axis which is different from said first axis wherein said first series of lines are parallel lines and said second series of lines are diverging radial lines.

* * * * *